(12) United States Patent
Fitzgerald et al.

(10) Patent No.: US 10,164,468 B2
(45) Date of Patent: Dec. 25, 2018

(54) PROTECTIVE COVER WITH WIRELESS CHARGING FEATURE

(71) Applicant: Otter Products, LLC, Fort Collins, CO (US)

(72) Inventors: John P. Fitzgerald, Fort Collins, CO (US); Carlton R. Lay, Auburn, AL (US)

(73) Assignee: Otter Products, LLC, Fort Collins, CO (US)

( * ) Notice: Subject to any disclaimer, the term of this patent is extended or adjusted under 35 U.S.C. 154(b) by 251 days.

(21) Appl. No.: 15/170,993

(22) Filed: Jun. 2, 2016

(65) Prior Publication Data

US 2016/0372973 A1    Dec. 22, 2016

Related U.S. Application Data

(60) Provisional application No. 62/180,542, filed on Jun. 16, 2015.

(51) Int. Cl.
*H02J 7/00* (2006.01)
*H02J 50/10* (2016.01)

(52) U.S. Cl.
CPC ............ *H02J 50/10* (2016.02); *H02J 7/0042* (2013.01); *H02J 7/0047* (2013.01); *H02J 2007/0096* (2013.01)

(58) Field of Classification Search
USPC ........ 320/108, 107, 112, 113, 114, 115, 116, 320/118, 119, 128, 127, 137, 162, 109,
(Continued)

(56) References Cited

U.S. PATENT DOCUMENTS

| 4,312,580 A | 1/1982 | Schwomma et al. |
| 4,413,221 A | 11/1983 | Benjamin et al. |

(Continued)

FOREIGN PATENT DOCUMENTS

| CN | 103171477 A | 6/2013 |
| WO | 1994000037 A1 | 1/1994 |

(Continued)

OTHER PUBLICATIONS

Branscombe, "The future of Wireless Power: 2. Taking Wireless Power Further", Tom's Guide, Mar. 28, 2011, <http://www.tomsguide.com/us/Wireless-Power-Tesla-Fulton-eCoupled,review-1641-2.html>, last accessed Jun. 11, 2015.

(Continued)

*Primary Examiner* — Alexis Pacheco

(57) ABSTRACT

A protective cover for a portable electronic device includes a protective shell for receiving and at least partially covering the portable electronic device. The protective cover includes a rechargeable power storage device and an electrical coil proximate a back surface of the shell. The protective cover also includes electrical circuitry configured to transfer first electrical power from the rechargeable power storage device to the installed portable electronic device. The electrical circuitry is also configured to transfer second electrical power from the rechargeable power storage device to the electrical coil. The electrical coil is configured to wirelessly transfer at least a portion of the second electrical power to a second portable electronic device. The protective cover may also include a visual indicator for indicating a status of the wireless transfer of the second electrical power to the second portable electronic device.

20 Claims, 5 Drawing Sheets

(58) Field of Classification Search
USPC .......................................................... 320/117
See application file for complete search history.

(56) References Cited

U.S. PATENT DOCUMENTS

| | | | |
|---|---|---|---|
| 4,957,205 A | 9/1990 | Rose | |
| 5,140,310 A | 8/1992 | DeLuca et al. | |
| 5,311,112 A | 5/1994 | Creaco et al. | |
| 5,325,040 A | 6/1994 | Bogut et al. | |
| 5,541,813 A | 7/1996 | Satoh et al. | |
| 5,583,742 A | 12/1996 | Noda et al. | |
| 5,669,004 A | 9/1997 | Sellers | |
| 5,681,122 A | 10/1997 | Burke | |
| 5,933,812 A | 8/1999 | Meyer et al. | |
| 6,005,368 A | 12/1999 | Frame | |
| 6,043,626 A | 3/2000 | Snyder et al. | |
| 6,058,356 A | 5/2000 | Swanson et al. | |
| 6,129,321 A | 10/2000 | Minelli et al. | |
| 6,169,384 B1 | 1/2001 | Shannon | |
| 6,184,654 B1 | 2/2001 | Bachner et al. | |
| 6,249,256 B1 | 6/2001 | Luxon et al. | |
| 6,304,459 B1 | 10/2001 | Toyosato et al. | |
| 6,317,313 B1 | 11/2001 | Mosgrove et al. | |
| 6,356,058 B1 | 3/2002 | Maio et al. | |
| 6,388,877 B1 | 5/2002 | Canova et al. | |
| 6,405,049 B2 | 6/2002 | Herrod et al. | |
| 6,456,487 B1 | 9/2002 | Hetterick | |
| 6,504,710 B2 | 1/2003 | Sutton et al. | |
| 6,532,152 B1 | 3/2003 | White et al. | |
| 6,538,413 B1 | 3/2003 | Beard et al. | |
| 6,944,782 B2 | 9/2005 | Mueller et al. | |
| 7,116,079 B2 | 10/2006 | Bayne et al. | |
| 7,312,984 B2 | 12/2007 | Richardson et al. | |
| 7,318,521 B2 | 1/2008 | Lau | |
| 7,359,184 B2 | 4/2008 | Lord | |
| 7,400,917 B2 | 7/2008 | Wood et al. | |
| 7,403,613 B2 | 7/2008 | Liou | |
| 7,612,997 B1 | 11/2009 | Diebel et al. | |
| 7,728,551 B2 | 6/2010 | Reed et al. | |
| 7,782,610 B2 | 8/2010 | Diebel et al. | |
| 7,868,585 B2 | 1/2011 | Sarnowsky et al. | |
| 7,876,272 B2 | 1/2011 | Dou et al. | |
| 7,888,629 B2 | 2/2011 | Heslin et al. | |
| 7,889,498 B2 | 2/2011 | Diebel et al. | |
| 8,013,572 B2 | 9/2011 | Rodgers | |
| 8,041,029 B2 | 10/2011 | Wiegers | |
| 8,208,980 B2 | 6/2012 | Wong et al. | |
| 8,214,003 B2 | 7/2012 | Wong et al. | |
| 8,286,013 B2 | 10/2012 | Chen et al. | |
| 8,310,200 B2 | 11/2012 | Matouka et al. | |
| 8,367,235 B2 | 2/2013 | Huang | |
| 8,442,602 B2 | 5/2013 | Wong et al. | |
| 8,541,974 B2 | 9/2013 | Farahani | |
| 8,690,600 B1 | 4/2014 | Zeolla | |
| 8,727,192 B2 | 5/2014 | Lai | |
| 8,750,948 B2 | 6/2014 | Wong et al. | |
| 8,907,752 B2* | 12/2014 | Wodrich | G06F 1/1635 335/219 |
| 9,026,187 B2 | 5/2015 | Huang | |
| 9,153,109 B1 | 10/2015 | Foster et al. | |
| 9,698,632 B2 | 7/2017 | Davison et al. | |
| 2002/0075003 A1 | 6/2002 | Fridman et al. | |
| 2003/0045246 A1 | 3/2003 | Lee et al. | |
| 2005/0188203 A1 | 8/2005 | Bhaskaran et al. | |
| 2005/0189913 A1 | 9/2005 | Vitanov et al. | |
| 2005/0224508 A1 | 10/2005 | Tajiri et al. | |
| 2005/0279661 A1 | 12/2005 | Hodges | |
| 2006/0022889 A1 | 2/2006 | Chiang et al. | |
| 2006/0244422 A1 | 11/2006 | DiGiovanna et al. | |
| 2006/0255493 A1 | 11/2006 | Fouladpour | |
| 2006/0261777 A1 | 11/2006 | Li et al. | |
| 2007/0052600 A1* | 3/2007 | Kamitani | G06K 7/0008 343/702 |
| 2007/0071423 A1 | 3/2007 | Fantone et al. | |
| 2007/0115387 A1 | 5/2007 | Ho | |
| 2007/0138920 A1 | 6/2007 | Austin et al. | |
| 2007/0146985 A1 | 6/2007 | Mick et al. | |
| 2007/0158220 A1 | 7/2007 | Cleereman et al. | |
| 2007/0226527 A1 | 9/2007 | Ang | |
| 2008/0011917 A1 | 1/2008 | Adams | |
| 2008/0164855 A1 | 7/2008 | Tam et al. | |
| 2008/0269724 A1 | 10/2008 | Sarkinen et al. | |
| 2008/0272741 A1 | 11/2008 | Kanamori | |
| 2008/0315826 A1 | 12/2008 | Alberth et al. | |
| 2008/0316687 A1 | 12/2008 | Richardson et al. | |
| 2009/0017884 A1 | 1/2009 | Rotschild | |
| 2009/0037284 A1 | 2/2009 | Lewis et al. | |
| 2009/0051223 A1 | 2/2009 | Woo | |
| 2009/0066529 A1 | 3/2009 | Fukada | |
| 2009/0106567 A1* | 4/2009 | Baarman | G06F 1/1628 713/300 |
| 2009/0115369 A1 | 5/2009 | Lin et al. | |
| 2009/0186264 A1 | 7/2009 | Huang | |
| 2009/0322158 A1 | 12/2009 | Stevens et al. | |
| 2010/0003950 A1 | 1/2010 | Ray et al. | |
| 2010/0093412 A1 | 4/2010 | Serra et al. | |
| 2010/0124040 A1 | 5/2010 | Diebel et al. | |
| 2010/0156344 A1* | 6/2010 | Inoue | H02J 5/00 320/108 |
| 2010/0171234 A1 | 7/2010 | Lee et al. | |
| 2010/0270970 A1 | 10/2010 | Toya et al. | |
| 2010/0323616 A1* | 12/2010 | Von Novak | H02J 7/0054 455/41.1 |
| 2011/0050164 A1 | 3/2011 | Partovi et al. | |
| 2011/0159324 A1 | 6/2011 | Huang et al. | |
| 2011/0163714 A1 | 7/2011 | Ettes et al. | |
| 2012/0019057 A9 | 1/2012 | Kirby et al. | |
| 2012/0028691 A1 | 2/2012 | Koehl | |
| 2012/0088558 A1 | 4/2012 | Song | |
| 2012/0091950 A1 | 4/2012 | Campanella et al. | |
| 2012/0106037 A1 | 5/2012 | Diebel et al. | |
| 2012/0112691 A1 | 5/2012 | Kurs et al. | |
| 2012/0178505 A1 | 7/2012 | Yang et al. | |
| 2012/0303520 A1 | 11/2012 | Huang | |
| 2012/0306431 A1 | 12/2012 | Li et al. | |
| 2012/0314354 A1 | 12/2012 | Rayner | |
| 2012/0316811 A1 | 12/2012 | Choi et al. | |
| 2012/0319467 A1 | 12/2012 | Andre et al. | |
| 2013/0038279 A1 | 2/2013 | Seyerle et al. | |
| 2013/0069583 A1* | 3/2013 | Lemelman | G06F 1/1635 320/107 |
| 2013/0119922 A1 | 5/2013 | Chen et al. | |
| 2013/0214730 A1 | 8/2013 | Lu et al. | |
| 2013/0220841 A1 | 8/2013 | Yang | |
| 2013/0234481 A1 | 9/2013 | Johnson | |
| 2013/0262248 A1 | 10/2013 | Kim et al. | |
| 2014/0065948 A1* | 3/2014 | Huang | H05K 5/0086 455/7 |
| 2014/0091758 A1* | 4/2014 | Hidaka | H01F 38/14 320/108 |
| 2014/0117921 A1 | 5/2014 | Suomela | |
| 2014/0191033 A1 | 7/2014 | Wojcik et al. | |
| 2014/0191724 A1 | 7/2014 | Wojcik et al. | |
| 2014/0210406 A1* | 7/2014 | Na | H02J 7/025 320/108 |
| 2014/0217965 A1 | 8/2014 | Wiemeersch et al. | |
| 2014/0253024 A1* | 9/2014 | Rautiainen | H02J 7/025 320/108 |
| 2014/0306654 A1* | 10/2014 | Partovi | H02J 7/025 320/108 |
| 2015/0111626 A1 | 4/2015 | Bell | |
| 2015/0236550 A1 | 8/2015 | Yang et al. | |
| 2015/0270734 A1 | 9/2015 | Davison et al. | |
| 2015/0364938 A1 | 12/2015 | Lapetina et al. | |
| 2016/0079793 A1* | 3/2016 | Cho | H02J 7/0042 320/108 |
| 2016/0211702 A1 | 7/2016 | Muratov et al. | |
| 2016/0261133 A1* | 9/2016 | Wang | H02J 7/025 |
| 2016/0294427 A1 | 10/2016 | Wojcik | |

(56) References Cited

U.S. PATENT DOCUMENTS

FOREIGN PATENT DOCUMENTS

| WO | 1999041958 | A1 | 8/1999 |
| WO | 2012074151 | A1 | 6/2012 |
| WO | 2012176206 | A2 | 12/2012 |
| WO | 2013080068 | A1 | 6/2013 |

OTHER PUBLICATIONS

Capdase CA00-C201 "PowerCup 2.2" Car Cup Holder Charger, available Dec. 2012, <http://www.amazon.in/Capdase-CA00-C201-Car-Mount-Holder/dp/B004OC5K1E> last accessed Jun. 11, 2015.
Haselton, "GM to Add Gadget Wireless Charging Feature to Cars in 2014", TechnoBuffalo.com, Aug. 24, 2014, <http://www.technobuffalo.com/2013/08/24/gm-wireless-charging-cars/>, last accessed Jun. 11, 2015.
Kurs et al., "Wireless Power Transfer via Strongly Coupled Magnetic Resonances", Science, Jul. 6, 2007, pp. 83-86, vol. 317.
Kuyvenhoven et al., "Development of a Foreign Object Detection and Analysis Method for Wireless Power Systems", 2011 IEEE Symposium on Product Compliance Engineering (PSES) Oct. 10, 2011-Oct. 12, 2011, San Diego, CA., pp. 1-6.
Ogg, "Wireless Power Gets Recharged", CNET Wireless Power, Jan. 5, 2007, <http://newsznet.com/Wireless-power-gets-recharged/2100-1041_3-6147684.html> last accessed Jun. 11, 2015.
Sengupta et al., "Universally Compatible Wireless Power Using the Qi Protocol", Low Power Design, 2011, pp. 1-6, <http://lowpowerdesign.com/article_TI-Qi.html> last accessed Apr. 11, 2014.

\* cited by examiner

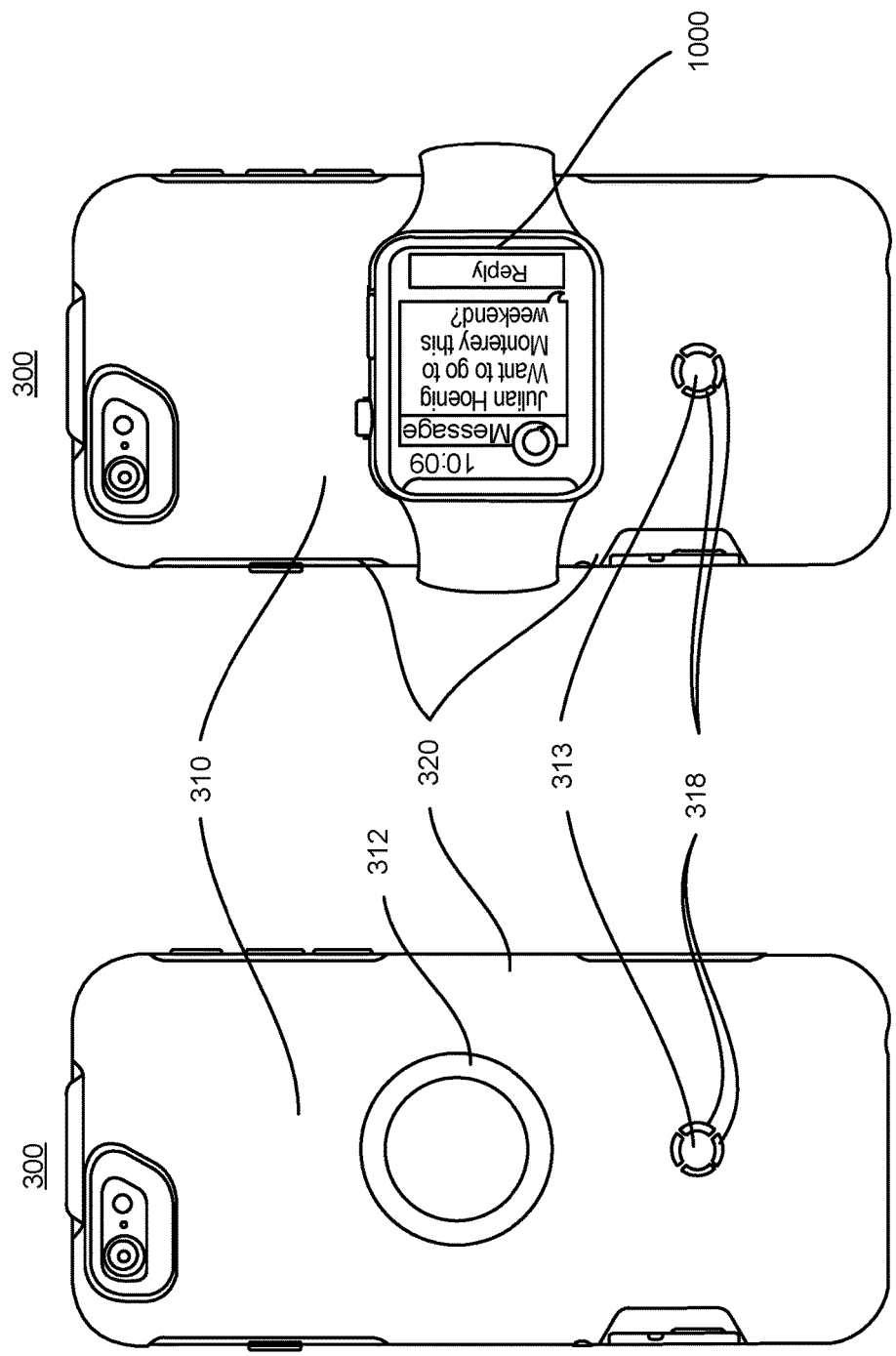

PROTECTIVE COVER WITH WIRELESS CHARGING FEATURE

CROSS REFERENCE TO RELATED APPLICATIONS

This application claims priority to U.S. Provisional Patent Application No. 62/180,542 filed on Jun. 16, 2015, which is hereby incorporated by reference in its entirety.

FIELD

The present disclosure relates to accessories for portable electronic devices. More specifically, the present application relates to protective covers and accessories that are fitted with circuitry and components for transferring power wirelessly.

BACKGROUND

Portable electronic devices, such as smartphones, are commonly used for communication and entertainment purposes. "Smart" watches and other wearable and/or portable electronic devices, such as wireless headphones and fitness devices, are becoming more widely used. A typical advantage of a wearable electronic device is its small size and weight. Often, the most convenient and lightweight "wearables" perform comparatively little processing, instead communicating data to a larger device such as a smartphone or tablet, in order to e.g., conserve power. In some instances, a wearable electronic device may, under normal use, provide only enough power for a few hours of operation before needing to be recharged.

Wearable electronic devices may communicate with a separate (e.g., portable) electronic device that may store and consume a much larger amount of electrical power or charge to power its own circuitry (e.g., processor(s)). This separate electronic device may perform a bulk of the processing for various tasks in order that the wearable electronic device may remain small, lightweight, and/or may consume little power.

In addition, a wearable electronic device may forego some switches, electrical connectors, and/or the like in order to provide greater resistance to ingress of water, sweat, dust, etc. In some instances this approach may limit the functionality of the device and/or may require the wearable electronic device to communicate data and/or power only wirelessly.

A smartwatch, for example, may communicate with a smartphone to receive notifications and other information and to provide data from smartwatch sensors. However, many wearable electronic devices have limited space for a power source, such as a battery. As a result a smartwatch, for example, may need to be recharged relatively frequently. This need for frequent recharging may prevent use of a smartwatch, or other wearable electronic device, by a person who does not have access to a typical charging source for an extended period of time. For example, a person going camping may find a smartwatch useless after one day due to lack of access to a charging source.

SUMMARY

In one exemplary embodiment, a protective case or cover for a portable electronic device is provided. The protective cover comprises a protective shell for receiving and at least partially covering the portable electronic device when the portable electronic device is installed in the protective cover. The protective shell has a back surface. A rechargeable power storage device is contained in the protective shell and a coil, electrical coil, inductive coil, and/or electrical inductive coil is proximate the back surface of the protective shell. The protective cover also includes electrical circuitry configured to transfer first electrical power from the rechargeable power storage device to the installed portable electronic device. The electrical circuitry is also configured to transfer second electrical power from the rechargeable power storage device to the electrical coil. The electrical coil is configured to wirelessly transfer at least a portion of the second electrical power to a second portable electronic device. The protective cover may also include a visual indicator for indicating a status of the wireless transfer of the second electrical power to the second portable electronic device when the second portable electronic device is positioned near the back surface of the protective shell. While examples are provided herein for purposes of illustration and description, other modifications and variations may be possible in view of the teachings herein.

Other embodiments are also disclosed including wireless charging devices which may not be configured in the form of a protective case or cover. The embodiments disclosed herein illustrate and explain the principles of the concepts and their practical application to enable others skilled in the art to best utilize them. However, the invention is to be limited only by the claims.

BRIEF DESCRIPTION OF THE DRAWINGS

Embodiments of the present invention will be described and explained through the use of the accompanying drawings in which:

FIGS. 3A and 3B illustrate rear view of a protective cover according to the disclosure;

FIG. 4A illustrates a charging puck according to a disclosed embodiment, while

DETAILED DESCRIPTION

To address a need for frequent recharging of a wearable and other portable electronic devices and/or a need to be away from a common or standard wired charging device that utilizes grid-based power systems, the present disclosure provides charging accessories that permit a user to wirelessly recharge a portable and/or wearable electronic device by taking power from another portable electronic device or from a protective cover that includes a power source.

Examples of wearable electronic devices include a smartwatch (e.g., APPLE WATCH), 3D glasses/goggles, smart eyewear (e.g., GOOGLE GLASS), a fitness band (e.g., chest- or arm-band with fitness processors), wireless headphones, a music player (e.g., mp3 player), and the like. These devices tend to include a small battery that may hold less than one day of battery life under normal usage. Under heavier use, wearable electronic devices may need to be recharged more than once per day.

Portable electronic devices in common use may include a smartphone, camera, tablet computer, laptop computer, music player, and the like. These devices may include a battery or other power source having significantly larger capacity than a battery of a wearable electronic device. In addition, some portable electronic devices may be fitted with a supplemental battery, such as that found in certain protective smartphone cases that include a battery. This disclosure discloses a case, such as a battery case for a portable electronic device, that includes electrical circuitry and/or electronics configured for wirelessly discharging power to a wearable electronic device. Of course, a battery case may also be configured to provide physical protection (against physical impact, scratching, water and/or dust ingress and the like) to the portable electronic device, as well as to provide electrical charge to the portable electronic device either by wired or wireless connection.

Also described herein are "puck" devices configured to receive power from an electrical port of a portable electronic device or battery case and to wirelessly provide some or all of that power to a wearable electronic device. The "puck" may be useful, for example, in conjunction with a battery case that is not configured for wireless discharge, or for discharge of power from a portable electronic device directly (e.g., without need of a battery case). For example, the puck may be used to charge a phone, a smartphone, a wearable electronic device, a music player, a fitness device, wireless headphones, a wireless headset, and/or the like.

Each embodiment described herein may include features that are introduced with respect to a particular embodiment, but which should be understood as possibly being included in any other disclosed embodiment.

Figure 1:
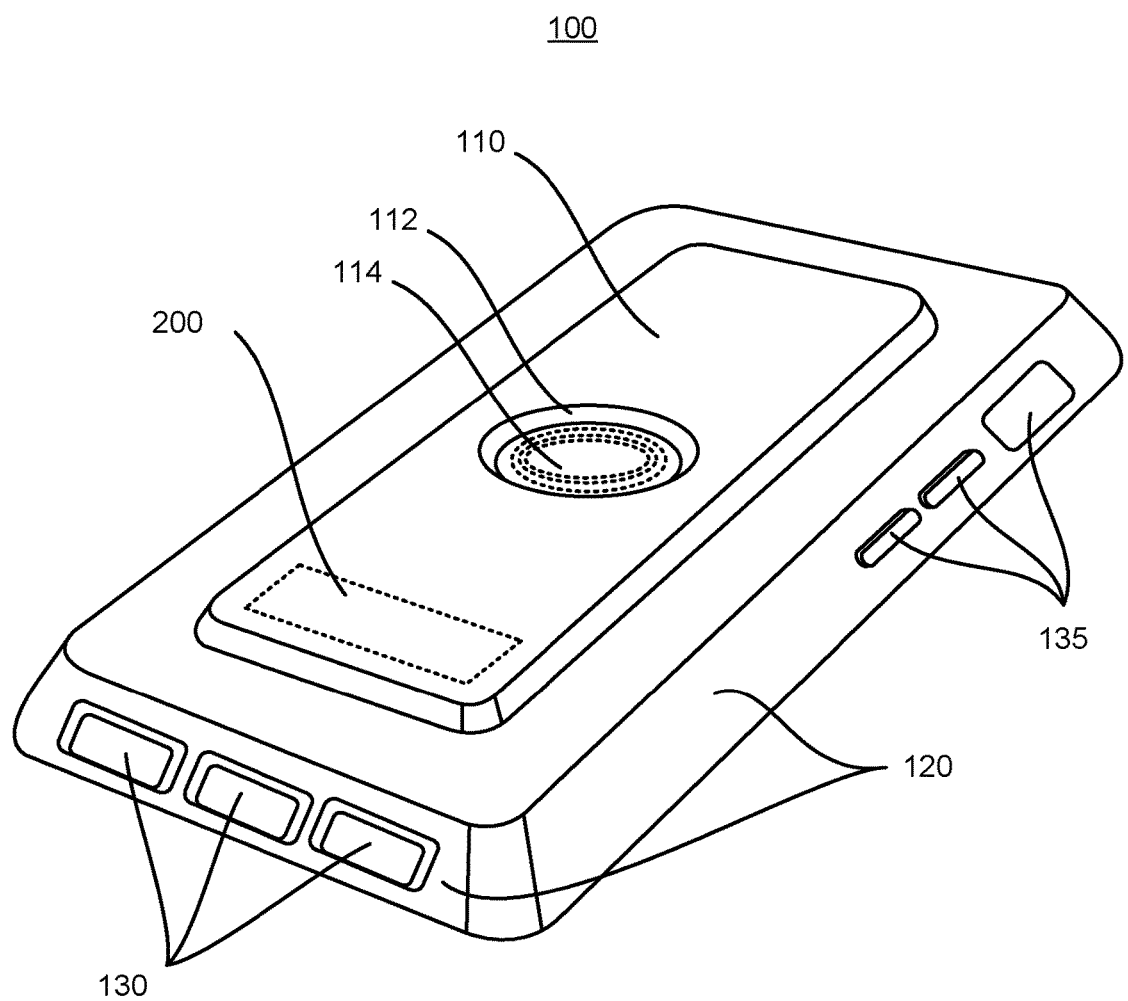
FIG. 1 illustrates a rear perspective view of a protective cover according to the disclosure.

FIG. 1 illustrates a rear perspective view of a protective cover 100 for a portable electronic device. The portable electronic device may be any type of smartwatch, wearable electronic device, fitness device, data tracker, personal camera, headphones, wireless headphones, wireless headset, wireless microphone, and/or the like. Protective cover 100 may include a shell or housing having an enclosed internal cavity that holds electrical circuitry electrical circuitry 200 (detailed in FIG. 2) for wirelessly charging a battery of another portable electronic device (not shown in FIG. 1). The shell may have a front surface (not shown), a rear surface 110, side surfaces forming a perimeter wall 120, openings 130 and 135, and a discharge receptacle 112. Protective cover 100 may partially or fully enclose or cover the portable electronic device. The rear surface 110 of the protective case 100 may include the discharge receptacle 112 structured to receive a wireless charging surface of the other portable or wearable electronic device. For example, the discharge receptacle 112 may be structured to receive the bottom of a smartwatch. Discharge receptacle 112 may serve to properly or better align or orient the wearable electronic device with protective cover 100 for purposes of transferring power and/or data between the wearable electronic device and protective cover 100 or between the wearable electronic device and a portable electronic device contained in protective cover 100. In some examples, protective cover 100 may not include discharge receptacle 112. In other examples, protective cover 100 may be referred to as a case or an encasement.

In some instances, the rear surface 110 may include one or more attachment structures for temporarily fastening the wearable electronic device to the discharge receptacle 112, holding the wearable electronic device in a particular position, and/or fastening the wearable electronic device to another portion of the rear surface 110. For example, the discharge receptacle 112 may include one or more magnets (not shown) to correspond with a ferromagnetic material or opposite-pole magnet of the wearable electronic device. In another example, discharge receptacle 112 may include one or more metallic elements to which one or more magnets of the wearable electronic device is attracted. In yet another example, the attachment structure(s) may include physical connectors such as a latching socket, interference fit, a snap, a slot, and/or the like.

The protective cover 100 may include a front surface (not shown) to receive a rear surface of the portable electronic device. The front surface may join the perimeter wall 120, such that the front surface and wall 120 together form an open, or partially open, cavity for receiving the portable electronic device. In some implementations, the perimeter wall 120 surrounds all sides of the front surface, while in other implementations the perimeter wall 120 may only partially surround the front surface. For example, the perimeter wall 120 may correspond to fewer than four sides of a substantially rectangular front surface, or may correspond to partial sides.

The perimeter wall 120 may include one or more openings 130 that accommodate access to electrical ports, sensors, audio speakers, and/or microphones of the installed or housed portable electronic device. The perimeter wall 120 may also include one or more openings 135 that accommodate access to buttons, switches, or other elements of the portable electronic device. In FIG. 1, the openings 130 are shown at an end portion of perimeter wall 120 and the openings 135 are shown at a side portion of the perimeter wall 120. It will be acknowledged that such openings may be in other locations, such as in the rear surface 110 or at a different end or side. Each opening 135 may be covered by a flexible membrane or overlay that seals out dirt, moisture, etc., while permitting a user to operate the underlying button or switch. The perimeter wall 120 may be rounded, beveled, or straight (e.g., perpendicular to the front surface). The protective cover 100 may include, e.g., in an enclosed internal cavity (not shown), electrical circuitry 200 (depicted in FIG. 1 using dotted lines). For example, a printed circuit board may be disposed toward an end of the protective case, and wireless charging components, such as a wireless power transfer antenna or coil, may be disposed at the discharge receptacle 112. These and other components of the electrical circuitry 200 are described in further detail below with respect to FIG. 2.

Figure 2:
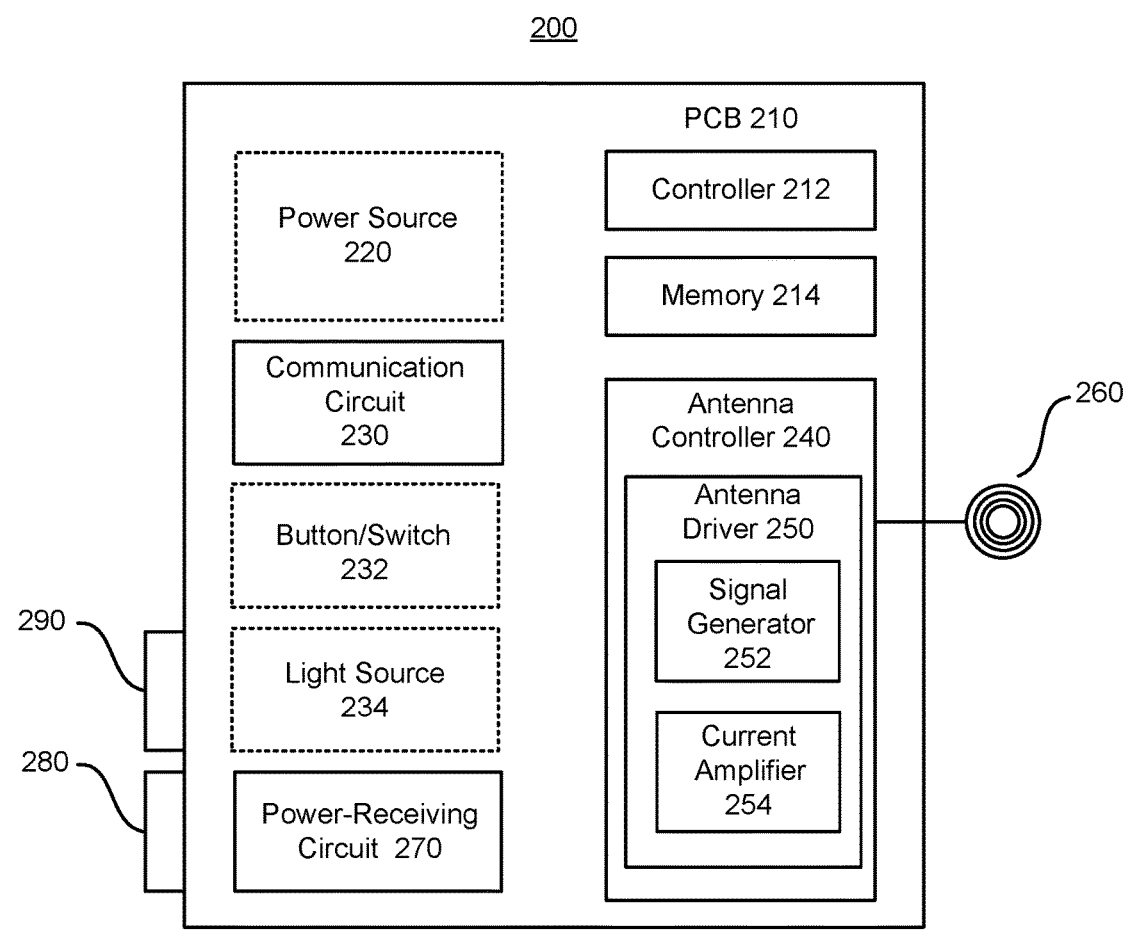
FIG. 2 illustrates a block diagram showing electrical circuitry of a charging accessory.

FIG. 2 provides a block diagram illustrating electrical circuitry 200 of the protective cover 100. The electrical circuitry 200 may include one or more of: a printed circuit board (PCB) 210 with electrical and/or electronic components affixed to it. Such electrical or electronic components may include one or more controllers 212, a data storage device (e.g., memory) 214, one or more power sources 220 such as a rechargeable battery, communication circuitry 230, an actuator (e.g., button or switch) 232 (described below with reference to FIGS. 3A-3B), one or more light sources 234, an antenna controller 240, and one or more wireless power transfer antennas 260 (such as an electrical coil or inductive coil). The electrical components may additionally include a wireless power receiving circuit 270, electrical connector(s) 280 at least for receiving power to charge and/or recharge a rechargeable type power source 220, and/or a second electrical connector 290 for connection to the portable electronic device. Each of the electrical components of the electrical circuitry 200 may be disposed at least partly inside the enclosed internal cavity (not shown) formed between the front surface and the rear surface 110 of the protective cover 100. It will be recognized particular embodiments may incorporate fewer or more electrical components, such as described below, in the enclosed internal cavity of protective cover 100.

In an implementation, the controller 212 of the protective cover 100 may include one or more processors, such as a microprocessor, microcontroller, digital signal processor (DSP), application specific integrated circuit (ASIC), programmable logic array, field programmable gate array, discrete components, or any combination thereof. The controller 212 may execute non-transitory, machine executable instructions stored at the data storage or memory device 214 to control wireless power transfer and/or other operations of the protective cover 100 described herein.

The controller 212 may be electrically connected to one or more of the data storage or memory devices 214 capable of storing instructions to be executed by the controller 212. The data storage or memory device(s) 214 may include a non-transient storage medium such as, by non-limiting example, one or more of a read-only memory (ROM), a random access memory (RAM), flash memory, secure digital, or the like. Instructions stored, or to be stored, in the data storage or memory device(s) 214 may constitute firmware or software for operating various functions of the protective cover 100.

For example, instructions stored in the data storage or memory device 214 may, when executed by the controller 212, manage a wireless charging operation including controlling an amount of electrical charge or power transferred from the portable electronic device, or from the power source(s) 220 of the protective cover 100, to the wireless power transfer antenna(s) 260 of the protective cover 100 to provide a changing magnetic field about the wireless power transfer antenna(s) 260. The instructions may permit the controller 212 to change a frequency of oscillation, an amount of current, and the like. The instructions may also permit the controller 212 to manage communications between the wearable electronic device and the communication circuitry 230 of the protective cover 100. In some instances at least a portion of the data storage or memory 214 may be used for storage of data collected by sensors (discussed below) of the protective cover 100 or received from the wearable electronic device or smartphone 800, and/or data such as analytics calculated or otherwise processed by the controller 212 of the protective cover 100.

A wireless power transfer may be performed in accord with one or more wireless power transfer protocols. For example, the electrical circuitry electrical circuitry 200 and instructions may be configured to cooperate in accord with Qi (TM), PMA (TM), A4WP (TM), and/or proprietary wireless power transfer protocols without departing from the structure and operation disclosed herein.

The one or more power sources 220 may include one or more batteries, which may include any type of energy storage or energy generation device and may include one or more types of energy or power storage devices such as: a fuel cell, a capacitor, a supercapacitor, a lithium titanate cell, a lithium ceramic cell, a bendable battery, and/or another type of power storage device or power generation device, including combinations thereof, any of which may be rechargeable. The protective cover 100 may be structured to hold non-rechargeable batteries, such as alkaline, and may include a door or other structure to facilitate removal and replacement of such non-rechargeable batteries. Protective cover 100 may also include one or more energy capturing devices such as a solar cell, a kinetic energy capture device, and/or an inductive coil.

The communication circuitry 230 may include elements programmed or connected for communication by a common standard, such as Bluetooth, Bluetooth Low Energy (BLE), WiFi, ZigBee, ANT+, or the like, or may utilize a proprietary communication scheme. In some embodiments, communication may take place via magnetic inductance fluctuations controlled by the controller 212 by way of the wireless power transfer antenna(s) 260. The communication circuitry 230 may include a secondary antenna (not separately illustrated), distinct from the wireless power transfer antenna(s) 260, for transmitting and/or receiving communications, e.g., to and/or from an attached wearable electronic device or smartwatch. In some implementations, the communication circuitry 230 may communicate information related to a wireless power transfer, e.g., to initiate or provide feedback on a wireless power transfer to the electronic device or smartwatch. In other implementations, information communication between the devices may also be conducted for purposes other than wireless power transfer.

The antenna controller 240 may include an antenna driver 250, which in turn may include a signal generator 252, a current amplifier 254, and communication circuitry (either included in the communication circuitry 230, or in a separate communication circuit) each contributing to providing an oscillating electrical current to wireless power transfer antenna(s) 260 disposed in the discharge receptacle 112 for purposes of wirelessly transferring electrical power.

The wireless power transfer antenna(s) 260 may include a coil, an electrical coil, an inductive electrical coil, and/or a magnetic induction coil disposed in the discharge receptacle 112 for inductive and/or resonant inductive power transfer from the power source(s) 220 of the protective cover 100 and/or from a housed portable electronic device to the wearable electronic device. In some cases, wireless power transfer antenna(s) 260 and/or another wireless power transfer antenna or coil may be used to transfer power from protective cover 100 to the installed portable electronic device. In other words, a protective cover may wirelessly transfer power to two or more different portable electronic devices, one of which may be installed in the protective cover.

Wireless power transfer antenna 260 may have a circular layout in some embodiments. Other antenna topologies may be utilized in accord with available area and/or volume for a wireless power transfer antenna 260 in the protective cover 100. In some embodiments (not illustrated) multiple wireless power transfer antennas 260 may be spatially distributed in order to provide a larger potential alignment area or greater number of potential efficient alignments for power transfer. In such embodiments the antenna controller 240 may control which wireless power transfer antenna(s) 260, of multiple antennas, is/are operational during a wireless power transfer based on which has/have the best alignment or coupling with the device to be charged.

The electrical circuitry 200 may also include power receiving circuity 270. This power receiving circuity 270 may include connectors (such as electrical connector 280) and/or a wireless power receiving coil (not shown) for receiving power to the protective cover 100. The protective cover 100 requires a supply of power in order to transfer such power to a wearable electronic device or smartwatch. The power receiving circuitry 270 may thus receive power supplied from, e.g., a standard electrical wall outlet via a cable attached to the electrical connector 280, when the protective cover 100 is equipped with the electrical connector 280 or from another external power source.

The electrical circuitry 200 may also include a second electrical connector 290 for connection to the portable electronic device (e.g., smartphone). For example, electrical connector 290 may be disposed in the open cavity formed by the perimeter wall 120 and front surface to engage an electrical port, electrical contacts, and/or an electrical interface of the portable electronic device. In some embodiments, second electrical connector 290 may serve multiple purposes. In one aspect, second electrical connector 290 may be utilized for "pass-through" of power received at the protective cover 100 via electrical connector 280 in order to directly charge a battery of the portable electronic device. In another aspect, electrical connector 290 may be utilized for recharging the battery of the portable electronic device from the power source(s) electrical circuitry 200 of the protective cover 100. In another aspect electrical connector 290 may be utilized for receiving electrical power from the portable electronic device for wireless transfer of the power to the wearable electronic device via the wireless power transfer antenna(s) 260 when a wearable electronic device is engaged with the discharge receptacle 112. Such wireless power transfer may be controlled by the controller 212 based on detection of a wearable electronic device being in wireless power transfer proximity (e.g., by magnetic attachment detection, Hall effect sensing, electro-mechanical switch, or the like).

Alternatively, when the protective cover 100 includes one or more wireless power receiving coils (not shown), the protective cover 100 may receive power wirelessly therethrough from an external wireless charging transmitter or source (not shown) for, e.g., recharging the power source(s) 220 and/or recharging the battery of a portable electronic device encased in the protective cover 100. In some instances, the wireless power transfer antenna(s) 260 may serve to both wirelessly transmit and wirelessly receive electrical power. In other cases, separate antennas or electrical coils may be used for receiving and transmitting power. The power receiving circuitry 270 may include one or more of a current limiter, power conditioning components, voltage step-up components, voltage step-down components, buck and/or boost converter, a battery charging controller, and a battery fuel gauge device. The power receiving circuitry 270 may thus function to condition and convey power that is received in order to charge a rechargeable power source 220 of the protective cover 100.

In some embodiments, a top surface 114 of the discharge receptacle 112 for receiving the bottom surface of the wearable electronic device may include the wireless power transfer antenna 260 within the material of the surface itself. For example, the top surface 114 of the discharge receptacle 112 may include an embedded conductive element constituting at least part of wireless power transfer antenna 260. Alternatively, the wireless power transfer antenna 260 may reside in the enclosed internal cavity of the protective cover 110. For electrical power efficiency, the wireless power transfer antenna 260 may be have a coil diameter that is approximately the same as a receiving coil in the wearable electronic device or other portable electronic device to be charged. In another embodiment a perimeter of the wireless power transfer antenna 260 may substantially correspond with a boundary of the rear surface 110 or be sized with width that is less than the cover boundary but larger than the discharge receptacle 112. In some embodiments, the protective cover may exclude the receptacle, instead relying on markings or user instruction for placement of the wearable electronic device in a position for wireless power transfer.

In some embodiments, the wireless power transfer antenna 260 may be include or be used with a ferrite backing (not shown) to help direct and focus magnetic flux of the antenna 260. The ferrite backing may be a planar sheet and/or may be formed as a trough into which the wireless power transfer antenna 260 may lay, or may have another form engineered to achieve at least one of a reduction in magnetic flux into adjacent circuitry and focusing of the electromagnetic flux toward a receiving coil of the wearable electronic device. The ferrite backing may include a portion at a core of the wireless power transfer antenna 260 that is thicker than other portions of the ferrite backing, or may include a second ferrite material at a core of the wireless power transfer antenna 260.

In addition to electrical and electronic components mentioned above, the electrical circuitry 200 of the protective cover 100 may include light sources 234, as illustrated in FIG. 2, and/or additional input or output sensors (not shown). One or more light sources, such as light sources 234 may be disposed on PCB 210 or otherwise secured in the enclosed internal cavity of the protective cover 100. In some embodiments, the light sources 234 may be disposed at the discharge receptacle 112.

The light source(s) 234 may include LED, fluorescent, electroluminescent, or other light sources or visual indicators, and may be disposed in a pattern, such as a circular pattern or a linear pattern. In some implementations, a light source 234 may be viewable directly through the protective cover 100 due to transparent or translucent housing material, or may protrude directly through a hole in the protective cover 100. When there are multiple light sources 234, the controller 212 may control the illumination of each light source 234 individually or in one or more groups. The controller 212 may cause the light sources 234 to illuminate in various sequences and/or patterns to indicate different notifications. In some implementations, the light sources 234 may be controlled to provide different colors or color combinations. In one non-limiting example, a group of light sources 234 may be illuminated separately in a pattern that indicates receipt of charge, transfer of charge, one or more internal battery levels, and/or other power and power-transfer related status or notifications.

In some implementations, the controller 212 may cause the light source(s) 234 to be illuminated in response to data received from the either the wearable electronic device (smartwatch) or from the portable electronic device (smartphone). For instance, the light source(s) 234 may be illuminated to indicate an alarm, receipt of an incoming telephone call, heart rate, heart rate zone, proximity to a beacon, or any other notification that the wearable electronic device or portable electronic device may provide. In some implementations the controller 212 may be programmable via firmware update or by interactive communication to customize the illumination pattern, color, sequence, and/or the like.

As discussed above, embodiments of the protective cover 100 may control discharge of electrical power from power source(s) 220 (e.g., battery) of the portable cover 100 to a portable electronic device that is not housed in protective cover 100. Alternatively, or additionally, the protective cover 100 may control power distribution directly from an encased portable electronic device to another portable electronic device, or to an electronic accessory of another type, without the need of a power source 220 in the protective cover itself. In such embodiments the electrical circuitry 200 may communicate with the portable electronic device via electrical connector 290 and/or by wireless communication to initiate power transfer configuration of the portable electronic device. The power may then be received by the power receiving circuitry 270 and conditioned/conveyed as described above.

Beneficially, protective cover 100 may enable a user to easily recharge a wearable electronic device from protective cover 100 while on the go, without needing to find another source of power, and/or without needing to carry a separate charging accessory associated with the wearable electronic device. Protective cover 100 may provide the charging power to the wearable electronic device from a power source contained within protective cover 100, from a power source associated with an electronic device contained in protective cover 100, and/or from the electronic device contained in protective cover 100.

FIGS. 3A and 3B illustrate a rear view of a protective cover 300. FIG. 3B additionally shows a smartwatch 1000, as an example of a portable electronic device, attached to the protective cover 300 at a charging location 312. Charging location 312 is an example of discharge receptacle 112. Protective cover 300 is an example of protective cover 100 and may include any of the features, elements, or functions of protective cover 100. The protective cover 300 includes the electrical circuitry 200 described above with reference to protective cover 100, and additionally may include an exterior button 313. The exterior button 313 may be disposed on a rear surface 310, or other surface (e.g., perimeter wall 320), of the protective cover 300 and may include a mechanical or capacitive switch, button, and/or other actuator 232 of electrical circuitry electrical circuitry 200 to permit a user to trigger or stimulate an operation of the protective cover 300. For example, the button 313 may be used to provide user-control for charging the wearable electronic device, evoke a notification of one or more statuses (such as battery status, charging time, or charge level), and/or to power the electrical circuitry 200 on or off.

The actuator 232 may be disposed on the PCB 210 or otherwise secured to an enclosed internal cavity of the protective cover 300 between the rear surface 310 and a front surface (not shown) of the protective cover 300, while the corresponding exterior button portion 313 of the protective cover 300 may engage the internally located actuator 232. The exterior button 313 may be implemented in a movable portion or, in the case of a capacitive switch, a region of the protective cover 300 may include one or more structures to permit or facilitate capacitive input.

Instructions executed by the controller 212 may interpret activation of the exterior button 313 (via the actuator 232) in accord with a predetermined action. For example, user pressing of exterior button 313, or a combination of such buttons in implementations utilizing multiple buttons, for a predetermined amount of time may result in an visual or auditory notification (e.g., by light sources 234 described below) of internal battery level, may turn off or turn on the electrical circuitry electrical circuitry 200 of protective cover 300, may initiate a wireless power transfer, and/or may trigger actions of the wearable electronic device, or of the portable electronic device, via communication to the wearable electronic device or portable electronic device. Such actions of the wearable electronic device or portable electronic device may include, for example, an electronic activation of a camera, a stopwatch start/stop, turning off an alarm, and/or activating/deactivating of other functions of the wearable electronic device or portable electronic device.

As shown in FIGS. 3A and 3B, the protective cover 300 may include windows or light pipes 318 that may direct light from light sources 234 through the rear surface 310 or other surface of the protective cover 300. The windows or light pipes 318 may focus or redirect light to a portion of the protective cover 300 remote from the location of the light sources 234. As shown in FIGS. 3A and 3B, the light pipes may be disposed around the button 313. However, it will be recognized by those of skill in the art that the light pipes 318 may be disposed anywhere in the protective cover 300 to direct light from light sources 234 placed anywhere in the protective cover 300. A visible portion of the light pipes 318 may be formed in various shapes, including round, semi-round, rectangular and/or other shapes. While examples of light sources and light pipes are provided herein, other devices for displaying information or communicating information to a user are possible, such as a liquid crystal display (LCD) element or an e-ink display element.

Figure 4B:
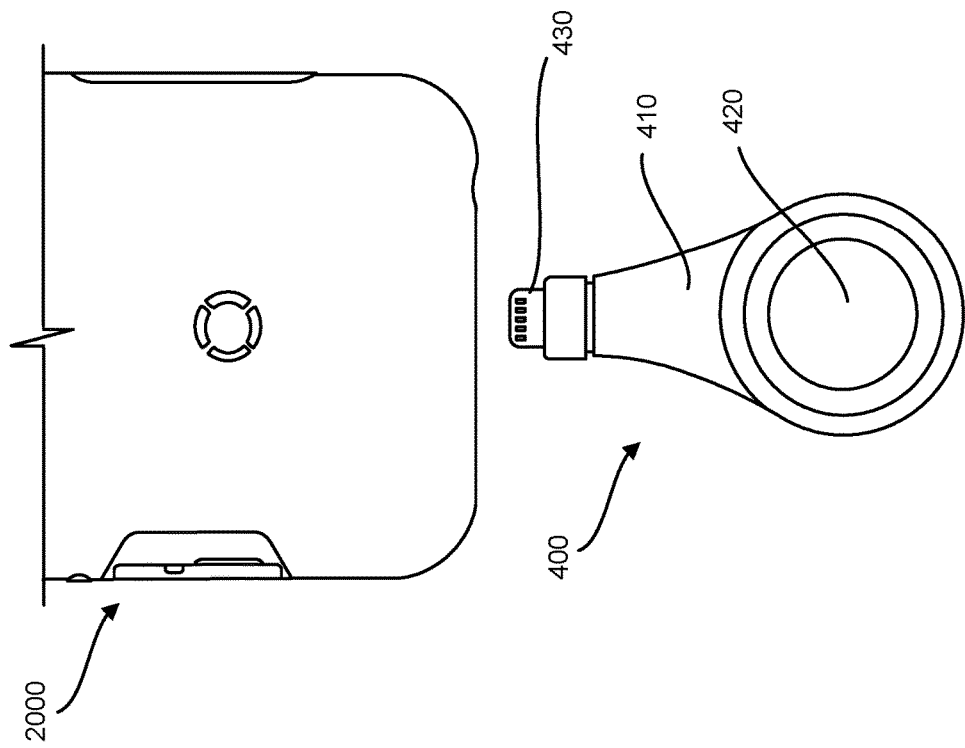
FIG. 4B illustrates an example connection of the charging puck to a smartphone.
Figure 4A:
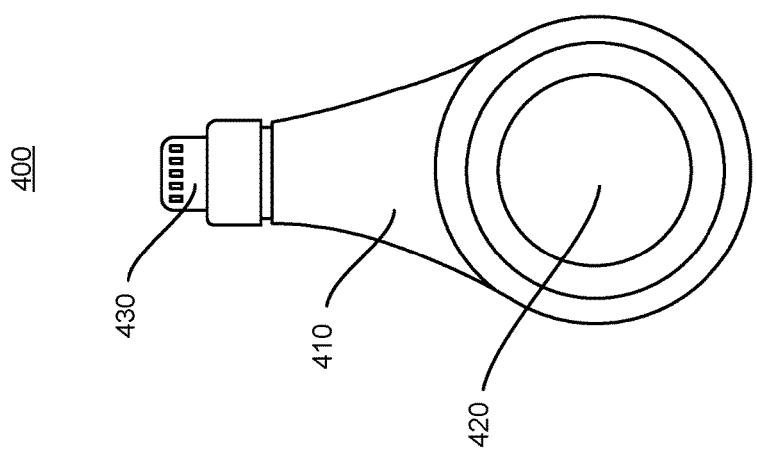

FIGS. 4A and 4B illustrate a charging puck 400 in accord with the present disclosure. FIG. 4B additionally shows a protective cover 2000 for a portable electronic device. The charging puck 400 may include a main body 410, a discharge receptacle 420, and a charge receiving electrical connector 430. The charging puck 400 may also include some or all of electrical circuitry electrical circuitry 200 described herein, although not necessarily shown in FIGS. 4A and 4B. Some embodiments of the charging puck 400 may include a power source such as power source 220, while other embodiments may not include an integral power source. While various embodiments are described as a "puck," the improvements and techniques disclosed herein are not to be limited to an apparatus of any particular physical shape or mechanical configuration.

The charge receiving electrical connector 430 may functionally correspond to electrical connector 290 described above in that it may be used for an electrical connection to electrical contacts, an electrical port, and/or an electrical interface of the portable electronic device. External power sources to which the charge receiving electrical connector 430 may be connected may, in addition to the portable electronic devices described above (e.g., a smartphone, tablet, laptop computer, etc.), include a battery case for such devices or an external battery pack. For example, when a user has a smartphone with a battery case thereon, the user may insert electrical connector 430 of the puck 400 into a micro-USB or other electrical port of the battery case. However, the user may alternatively connect electrical connector 430 directly to the electrical port (e.g., APPLE LIGHTNING, USB, etc.) of the portable electronic device.

Initiating a power transfer may include a power transfer data communication handshake and/or processing at the portable electronic device, battery case, or other smart or powered device. Such power transfer handshake may also include communication handled by the controller 212 and/or communication circuitry 230. When power is available from the power source (portable electronic device, battery case, etc.) it is conveyed through electrical connector 430 to power receiving circuitry 270 and processed, conditioned, etc. to produce a changing magnetic field at the discharge receptacle 420 for wireless charging of the wearable electronic device.

The main body 410 provides a rigid, compact, lightweight, portable unit that holds together the discharge receptacle 420 and electrical connector 430. A person may carry the charging puck 400, for example, in a pocket or bag. When the person needs to recharge the wearable electronic device, the charging puck 400 may be connected to portable electronic device, as shown in FIG. 4B, and the wearable electronic device may be attached to the charging puck 400 via the discharge receptacle 420. Discharge receptacle 420, similar to discharge receptacle 120 described herein, may include an attachment element such as one or more magnets, a latch, hook-and-loop structure or the like, to attach the wearable electronic device to the charging puck or to establish proper alignment between the two. The discharge receptacle 420 may be a recessed area, or may be a flat surface. Alignment markings may be provided in this embodiment to aid the user in placing the wearable electronic device for charging.

Charging puck 400 enables a user of a wearable electronic device to charge the wearable electronic device from a portable electronic device or from a case of a portable electronic device without having to locate another power source. Beneficially, charging puck 400 enables the user to perform this charging function without needing a portable electronic device or case that is specially configured for charging the wireless electronic device.

Figure 5:
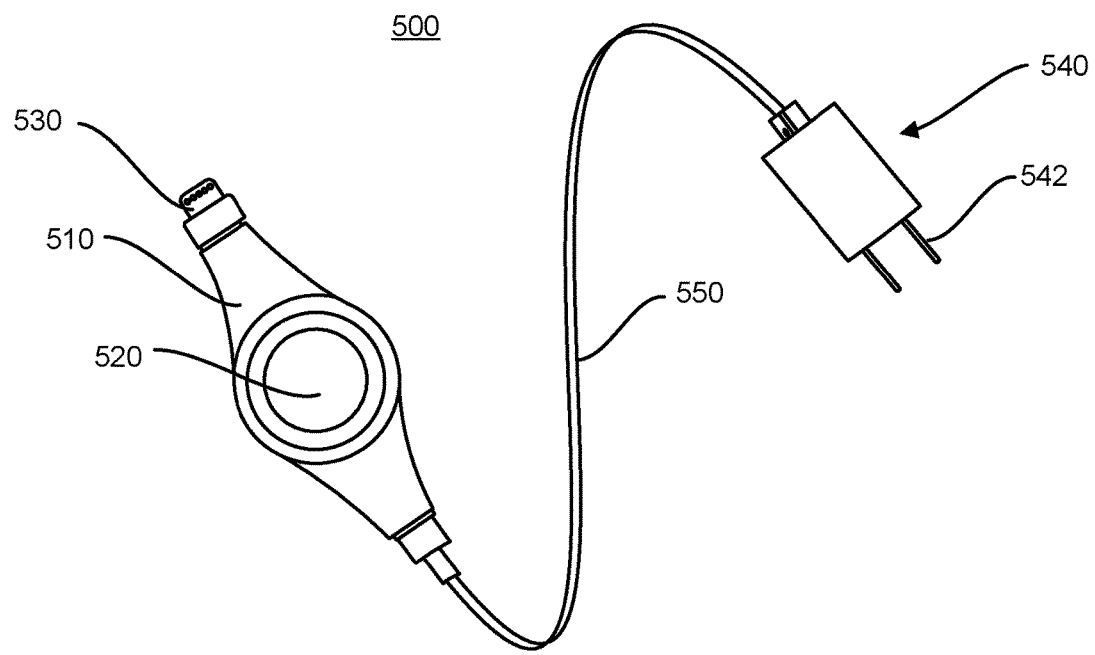
FIG. 5 illustrates a 2-in-1 charging puck according to the disclosure.

FIG. 5 illustrates a 2-in-1 charging puck 500. 2-in-1 charging puck 500 may include some or all of the elements, functions, and/or features of charging puck 400 described above. For example, similar to the charging puck 400, the 2-in-1 charging puck 500 includes a main body 510 having a discharge receptacle 520 (similar to 420, 120 above) and an electrical connector 530 (similar to electrical connector 430 described above). In addition to the corresponding structure and any of the electrical or electronic components discussed herein, the 2-in-1 charging puck may include an input power connection. The input power connection may include a second electrical connector 540 and a cable 550. In some embodiments, the second electrical connector may include an electrical plug 542 for connection with a standard electrical outlet such as may be commonly found in homes and businesses. The second electrical connector 540 may in such embodiments include an AC/AC or AC/DC converter to provide power directly to the 2-in-1 charging puck 500. In some instances, a low voltage AC signal may be used to charge a rechargeable battery. Alternatively, the second electrical connector 540 may include a USB or other electronics-type electrical connector that may be attached to a separate "wall wart" type electrical power converter.

The cable 550 may be a multi-conductor cable and may in some embodiments be detachable from the main body 510 via a cable connector (not shown), such that the 2-in-1 charging puck 500 may functionally perform just as charging puck 400 described above. With the cable 550 attached, however, the 2-in-1 charging puck 500 may receive power from an external source, such as municipal power from a power outlet, to charge either or both a wearable electronic device disposed on the discharge receptacle 520 (via wireless power transfer) and a portable electronic device or battery case attached to the electrical connector 530 (via wired power transfer).

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," " "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments, or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A protective cover for a portable electronic device, the protective cover comprising:
    a protective shell for receiving and at least partially covering the portable electronic device when the portable electronic device is installed in the protective cover, the protective shell having a back surface;
    a rechargeable power storage device contained in the protective shell;
    an electrical coil proximate the back surface of the protective shell;
    electrical circuitry configured to:
        transfer first electrical power from the rechargeable power storage device to the installed portable electronic device; and
        transfer second electrical power from the rechargeable power storage device to the electrical coil, the electrical coil configured to wirelessly transfer at least a portion of the second electrical power to a second portable electronic device that is not in the protective shell when the second portable electronic device is positioned near the back surface of the protective shell proximate the electrical coil, the wireless transfer of the at least a portion of the second electrical power to the second portable electronic device occurring through electrical induction; and
    a visual indicator for indicating at least a status of the wireless transfer of the at least a portion of the second electrical power to the second portable electronic device when the second portable electronic device is positioned near the back surface of the protective shell.

2. The protective cover of claim 1 further comprising an electrical connector affixed to an interior surface of the protective shell, the electrical connector configured to engage an electrical interface of the installed portable electronic device, wherein the first electrical power is transferred to the installed portable electronic device through the electrical connector.

3. The protective cover of claim 1 further comprising a second electrical coil, wherein the first electrical power is transferred to the installed portable electronic device wirelessly through the second electrical coil.

4. The protective cover of claim 1 wherein the first electrical power is transferred to the installed portable electronic device wirelessly through the electrical coil.

5. The protective cover of claim 1 further comprising an electrical connector accessible at an outer surface of the protective shell, the electrical connector configured for receiving charging power from an external power source for charging the rechargeable power storage device.

6. The protective cover of claim 1 wherein the electrical coil and the electrical circuitry are further configured for wirelessly receiving charging power from an external power source for charging the rechargeable power storage device.

7. The protective cover of claim 1 wherein the wireless transfer of the at least a portion of the second electrical power to the second portable electronic device includes resonant inductive power transfer.

8. The protective cover of claim 1 further comprising one or more magnetic elements configured to attract or be attracted by corresponding magnetic elements of the second portable electronic device for aligning the second portable electronic device with the electrical coil.

9. The protective cover of claim 1, the protective shell further having a recess for receiving at least a portion of the second portable electronic device, wherein the recess is configured to align the second portable electronic device with the electrical coil.

10. The protective cover of claim 1 wherein the electrical circuitry includes a microprocessor and communication circuitry for conducting data communications with one or more of the portable electronic device and the second portable electronic device.

11. The protective cover of claim 10 wherein the communication circuitry includes wireless communication circuitry and at least a portion of the data communications is conducted wirelessly.

12. The protective cover of claim 11 further comprising an antenna for the wireless data communications, wherein the antenna is separate from the electrical coil.

13. The protective cover of claim 11 wherein the wireless communications are conducted through the electrical coil using magnetic inductance fluctuations.

14. The protective cover of claim 1 further comprising a solar cell for producing charging power to charge the rechargeable power storage device.

15. The protective cover of claim 1 further including ferrite material proximate the electrical coil for increasing an efficiency of the wireless transfer of the at least a portion of the second electrical power to the second portable electronic device.

16. A protective case for a first portable electronic device having a battery, the protective case comprising:
a shell for receiving and at least partially covering the first portable electronic device when the first portable electronic device is in the protective case;
an inductive electrical coil proximate a surface of the shell;
an electrical connector at an interior surface of the shell, the electrical connector for electrically interconnecting to an electrical interface of the first portable electronic device when the first portable electronic device is in the shell;
electrical circuitry including a microprocessor, the electrical circuitry configured to receive electrical power from the battery of the first portable electronic device through the electrical connector when the first portable electronic device is in the protective case, the electrical circuitry and the inductive electrical coil configured to wirelessly transfer at least a portion of the electrical power received from the first portable electronic device to a second portable electronic device positioned outside the protective case and near the inductive electrical coil, the second portable electronic device being a separate device from the first portable electronic device; and
a visual indicator for indicating at least a status of the wireless transfer of the at least a portion of the received power to the second portable electronic device when the second portable electronic device positioned outside the protective case near the inductive electrical coil.

17. The protective case of claim 16 wherein the inductive electrical coil is further configured to wirelessly receive charging power from an external power source and the electrical circuitry is further configured to transfer at least a portion of the received charging power to the first portable electronic device through the electrical connector when the first portable electronic device is in the protective case.

18. A case for a portable electronic device, the case comprising:
a shell for receiving and at least partially covering the portable electronic device when the portable electronic device is in the shell;
a rechargeable battery contained in the shell;
an inductive electrical coil contained in the shell, the inductive electrical coil configured for inductive wireless power transfer to an electronic accessory device when the electronic accessory device is positioned proximate the shell; and
electrical circuitry adapted to wirelessly transfer first electrical power from at least one of the rechargeable battery contained in the shell and the portable electronic device to the inductive electrical coil for wireless transfer of the first electrical power to the electronic accessory device when the electronic accessory device is positioned proximate the shell, the electrical circuitry adapted to visually indicate a status of the wireless transfer of the first electrical power to the electronic accessory device, the electrical circuitry further adapted to transfer second electrical power from the rechargeable battery of the shell to the portable electronic device when the portable electronic device is in the shell.

19. The case of claim 18 wherein the transfer of the second electrical power from the rechargeable battery of the shell to the portable electronic device includes wireless transfer of the second electrical power to the portable electronic device through the inductive electrical coil.

20. The case of claim 18 further comprising a second inductive electrical coil, wherein the transfer of the second electrical power from the rechargeable battery of the shell to the portable electronic device includes wireless transfer of the second electrical power to the portable electronic device through the second inductive electrical coil.

* * * * *